United States Patent [19]

Reines et al.

[11] 3,893,024

[45] July 1, 1975

[54] METHOD AND APPARATUS FOR FAULT TESTING MULTIPLE STAGE NETWORKS

[75] Inventors: Jose Reines, Glen Ellyn; Eric G. Platt, Westmont; Stanley E. White, Crestwood; Joseph M. Corrado; Askold W. Wawryszyn, both of Chicago, all of Ill.

[73] Assignee: International Telephone and Telegraph Corporation, New York, N.Y.

[22] Filed: Nov. 15, 1973

[21] Appl. No.: 416,031

[52] U.S. Cl. .............................. 324/51; 179/175.23

[51] Int. Cl. ........................ G01r 31/02; H04m 3/26

[58] Field of Search .................. 324/51, 66, 73, 28; 179/175.3 A, 175.3 F, 175.21, 175.23, 175.25

[56] References Cited

UNITED STATES PATENTS

| | | | |
|---|---|---|---|
| 3,430,135 | 2/1969 | Mullen | 324/51 |
| 3,723,867 | 3/1973 | Canarutto | 324/51 X |
| 3,795,860 | 3/1974 | Sylvan | 324/73 R |

*Primary Examiner*—Gerard R. Strecker

*Attorney, Agent, or Firm*—James B. Raden; Marvin M. Chaban

[57] ABSTRACT

An apparatus for testing the crosspoints of a multiple stage end-marked switching network. The network being tested comprises in each stage at least one orthogonal matrix of bistable, solid-state crosspoints. The network has a predetermined plurality of unique paths between each fixed point at the opposite ends of the network. Those paths are clearly defined in at least one intermediate stage of the network such that the paths can be checked for open circuit conditions and short circuit conditions by enabling specific paths or groups of paths in that stage and inhibiting all other paths or groups of paths. The apparatus shown may be controlled by controls which may be incorporated into a stored program controller controlling the switching network or by means of a computer programmed to perform routining of the exchange including the network.

9 Claims, 9 Drawing Figures

PATENTED JUL 1 1975 ,893,024

SHEET 4

METHOD AND APPARATUS FOR FAULT TESTING MULTIPLE STAGE NETWORKS

BACKGROUND OF THE INVENTION

In end-marked switching networks which do not employ in-network controls, the efficiency of the network is dependent on the proper operation of the individual crosspoints of the network. Where such networks include a plurality of available paths one of which may be completed without controls, testing of the crosspoints becomes a very difficult and time-consuming task. Periodic routining of this multiplicity of crosspoints individually becomes practically impossible as the network is increased in size.

In a multi-stage crosspoint network where the crosspoint elements are solid state circuit components such as four layer dioes, the diodes should periodically be checked for open circuits and short circuits. Testing must be effected by a process of elimination or by controlled operation of each diode. Alternately, systems have been devised which minimize the effect of defective diodes and allow defective diodes to remain so long as the operation of the remainder of the matrix is not jeopardized. This approach of ignoring problems until they become a major factor obviously is far from being an acceptable solution to the maintenance.

SUMMARY OF THE INVENTION

A traditional shortcoming of end-marked networks has been the inability to detect faulty crosspoints. The reliability of solid state crosspoints is such that this shortcoming is not important for small networks. However, as a network grows, the capability to detect crosspoint faults must be introduced. The method for implementing such testing in the present system includes use of the lineograph of the network and the stored program controller used for controlling switching through the network. The network disclosed herein as an example of the network being tested has nine paths between any inlet and any outlet, the paths passing through the multiple stages of the network. A simple circuit in the one selected stage of the network under program command, can cause any eight out of the nine paths between one inlet and one outlet to appear blocked. In this way, a completed test call between the one inlet and the one outlet would indicate the proper operation of four diodes, one in each stage. A failure would trigger several test calls between the one fixed point on one end of the network and a variable point at the other end. Correlation of the results of these test calls would isolate any fault down to a specific stage. The maintenance program required to perform this function may reside off-line for use on demand, and be loaded into main memory for execution during low traffic periods. Complete checkout of the network is programmed and may be achieved approximately once a month using the stored program control of the system.

The present invention discloses a computer controlled testing system for periodically testing the paths through a multiple stage switching network to find defective crosspoint elements. The testing is accomplished by completing paths through the network and by directing the paths to specific sections to determine which of the elements may be defective by multiple checks through the network paths, and by disabling certain paths to direct path completion through other paths.

First, all possible paths between two endpoints or levels as they are called herein are disabled and paths betweeen these points are attempted for the purpose of testing the test circuit. Once the test circuit has been validated, testing may be undertaken.

The individual levels or alternative paths are separated into sections within one stage of the network. Thus by successively enabling sections of that stage and disabling remaining sections, successive levels or alternative paths between two end-points may be successively tested for path completion. In this way, by determining which paths fail during successive tests, the entire network may be checked and defective diodes found for replacement.

It is therefore an object of the invention to provide a computer controlled arrangement for testing a matrix network for defection crosspoint elements within the network.

It is a further object of the invention to provide a testing apparatus for a multiple-stage, end-marked network to find defective crosspoints by testing for path completions through the network.

It is a still further object of the invention to provide an apparatus for testing end-marked crosspoint networks having a plurality of possible paths between individual end-points by enabling these paths successively as a step in the testing process.

It is a still further object of the invention to provide a computercontrolled testing of a switching network of crosspoints comprised of solid state devices such as four-layer devices by completing paths through the network to determine whether any crosspoint devices are defective.

Other objects, features and advantages of the invention will become apparent from the following detailed description viewed in conjunction with the drawings, the description of which follows.

Figure 1:
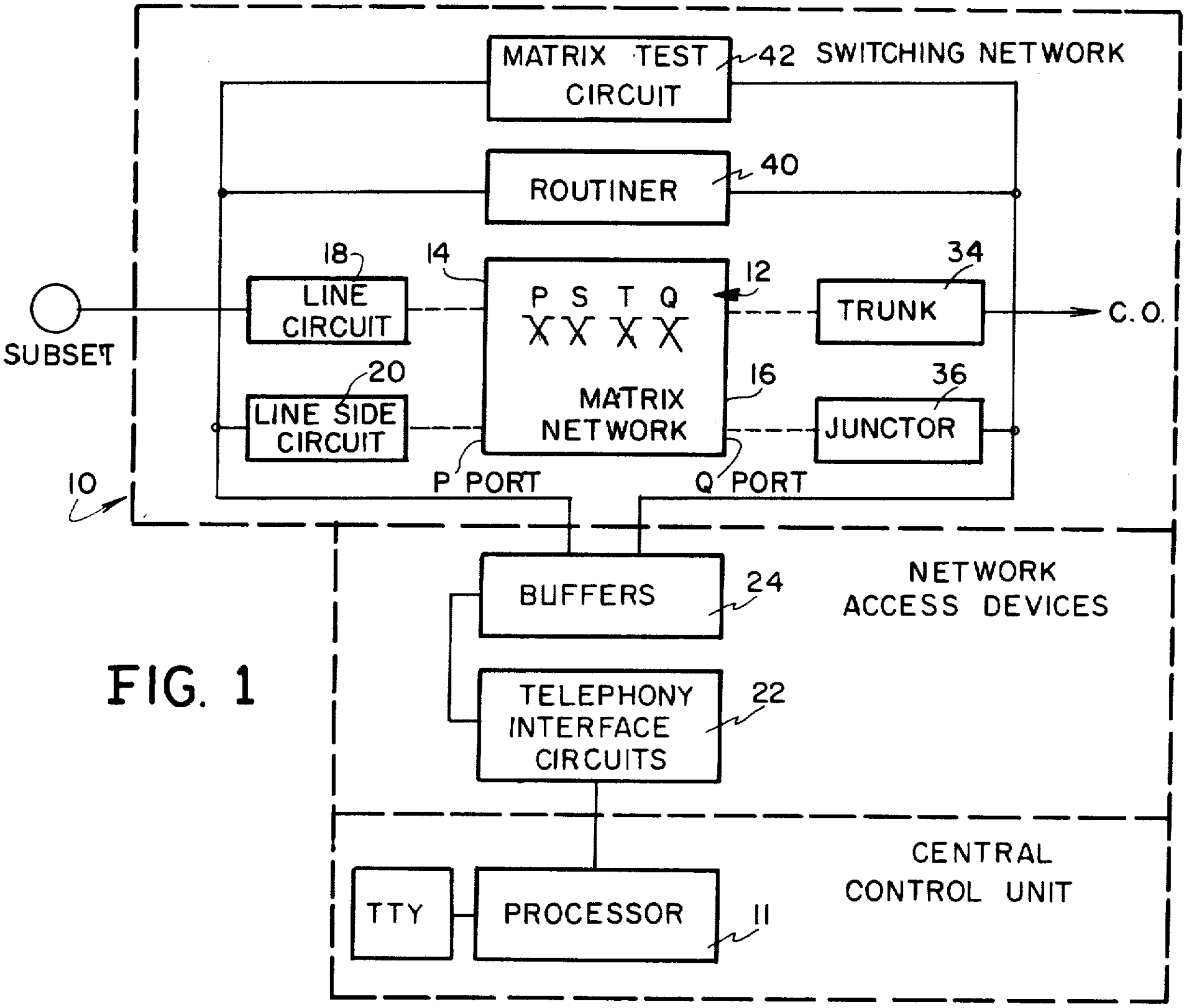
FIG. 1 is a schematic block diagram of a stored program controlled telecommunications exchange employing our invention.

DETAILED DESCRIPTION OF THE DRAWINGS:

In FIG. 1, we show in block form a telecommunications exchange of one exemplary size, including an electronic switching network 10 controlled by a stored program controller 11.

Electronic switching systems of the type used herein are generally of the type shown in U.S. Pat. No. 3,133,157 issued on 5/12/64 to E. Platt et al; U.S. Pat.

No. 3,201,520 issued 8/17/65 to J. Bereznak; U.S. Pat. No. 3,204,044 issued 8/11/65 to V. E. Porter; U.S. Pat. No. 3,258,539 issued 6/28/69 to N. Mansuetto et al; and U.S. Pat. No. 3,452,158 issued 6/24/69 to N. Jovic. These patents show various types of electronic switching systems employing PNPN devices as crosspoints of an orthogonal matrix, with a cascade of matrices forming a multiple stage network. The network is of the end-marked type, somtimes called self-seeking. In a network of this type, a bias signal called a mark is placed on one multiple or port at each end of the network and a path is automatically completed between the marked ports. Such systems are characterized by the absence of in-network controls for path completion.

Figure 2:
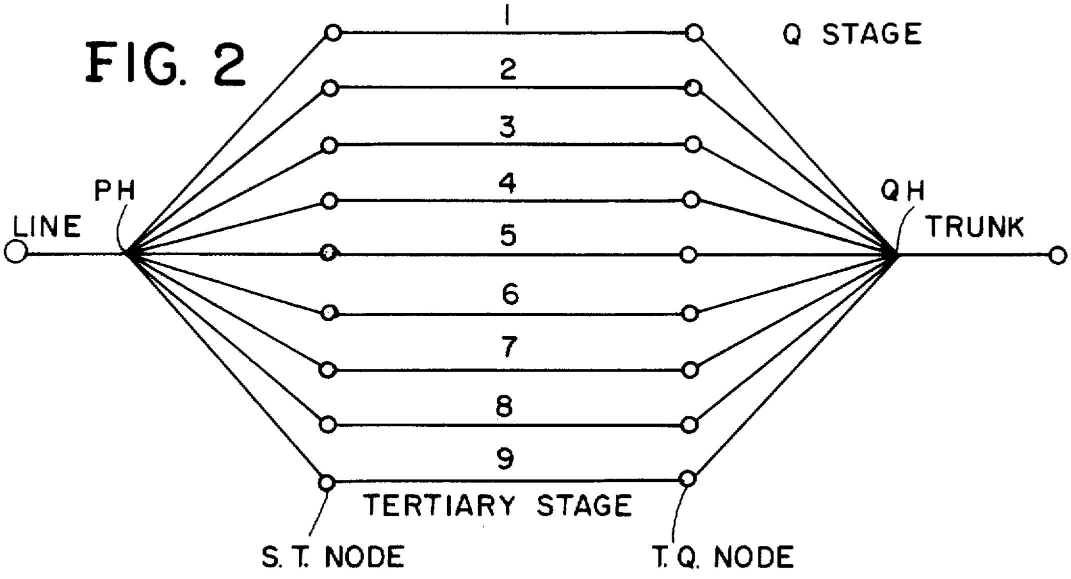
FIG. 2 is a lineograph of the paths between line side circuit and a trunk side circuit in the switching network of FIG. 1.

In the network, a number of parallel paths through the network are possible between the end-marked multiple points, the number of paths being dependent on grade of service and the economics of switching network size. FIG. 2 shows a system with nine available paths between a line multiple point (PH) and a supervisory side multiple point (QH). These paths are provided in separate groups within at least one stage as will be explained.

The stored program controller of FIG. 1 may comprise one or preferably two general purpose computers programmed for network control. The processor also controls and may be controlled in known fashion by a teletypewriter designated as TTY in FIG. 1. The computers (called processor 11 herein) may be used with one computer on-line and the other on standby or in load-sharing mode, both practices being wellknown in the art at this time. The processor provides all the control functions for the switching network which includes the switching matrix 12, and the circuits peripheral to the matrix on either its line side 14 or its supervisory side 16. The line side of the matrix terminates at its respective multiple points, individual circuits 18 representing lines or subscriber station subsets within the system, and other circuits 20 having line side appearances, the line side being referred to as the P or primary side of the network.

The supervisory side of the network has individual connections to circuits such as trunk circuits 34 having connection to external lines to other offices, and junctors 36 for completing local connections. The switching network further includes added circuits such as routiner 40 and matrix test circuit 42, both individually operable under the control of the processor. It is to the operation of the latter circuit in conjunction with the processor for testing the crosspoint elements of the matrix that the present invention is directed.

Shown also in FIG. 1 are network access circuits peripheral to the switching network and comprising telephony interface circuits 22 and buffer circuits 24 for interfacing between the switching network 10 and the processor 11.

Figure 3:
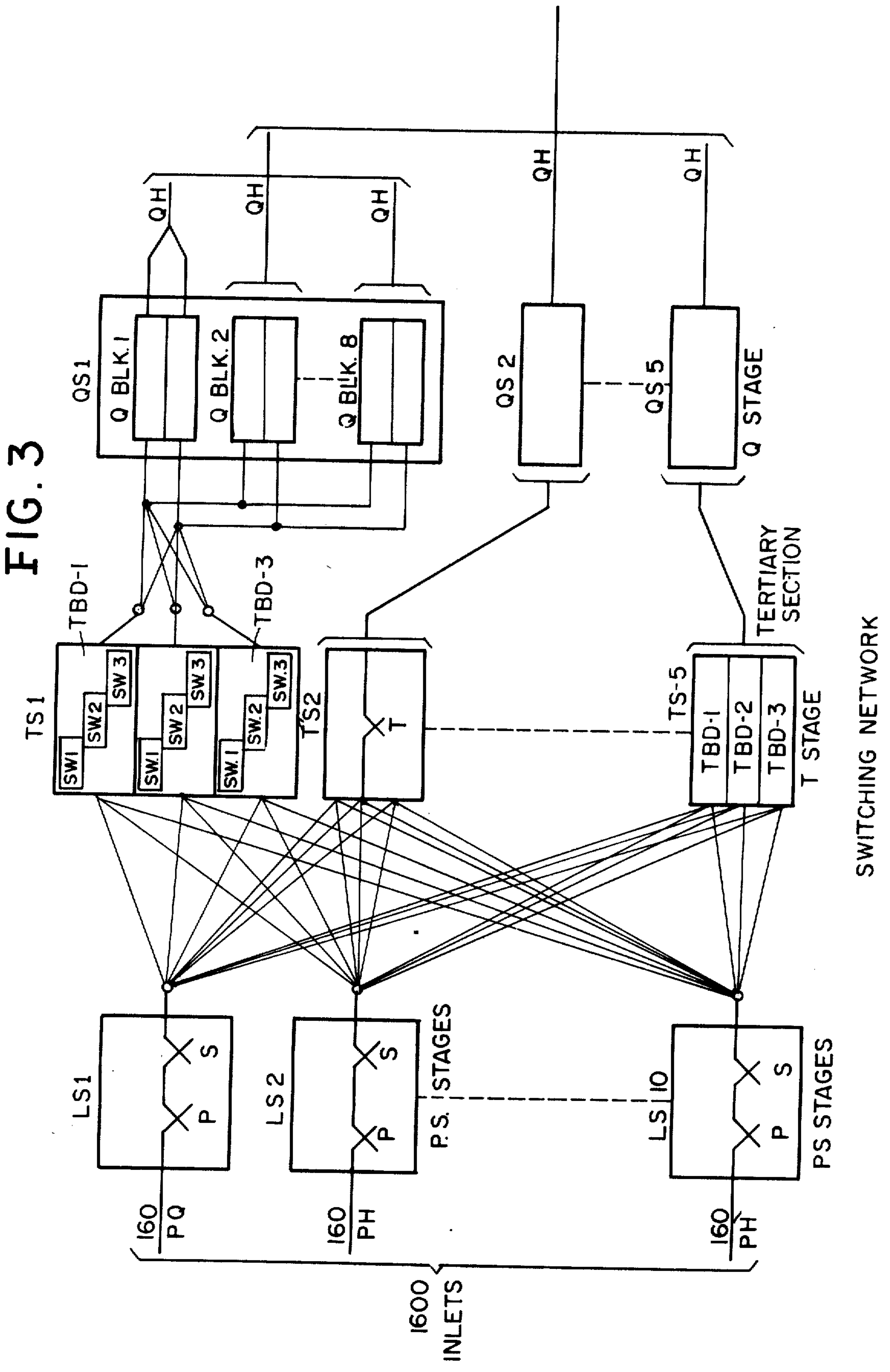
FIG. 3 is a schematic block diagram of the trunking arrangement in the network of FIGS. 1 and 2.

In the four stage network disclosed in FIG. 3, each matrix is rectangular with intersecting orthogonal multiples. The horizontal multiples of the line side (P side) are each connected to a line circuit 18 representing an individual subscriber or line side circuit 20. Disclosed is a system with 1600 lines or 1600 line side appearances, there being 160 appearances in each of ten like sized sections. Systems of other size in line number and network size and configuration may be tested using the principle disclosed herein.

The primary and secondary stage matrices are interconnected to provide 45 outlets from each 160-line section in a two-stage concentration. Within the primary stage, each line appearance comprises a horizontal multiple with nine crosspoints on the multiple, each crosspoint having access to five secondary multiples, thus totalling the 45 outputs from the secondary stage. Within the next or tertiary stage, there are a total of five sections with each section comprised of nine matrices, grouped into groups of three matrices per trunk block, a total of 15 such blocks. The possible paths from each line side appearance are separated so that one path passes through each matrix. The paths from a particular line side appearance are thus distributed through the matrices of a tertiary section with only one path per matrix. The paths from the line sections are evenly distributed through the tertiary stage using the pattern noted above, i.e., one path from the particular line side horizontal multiple having nine possible paths through the nine matrices of a trunk section. Matrices as used in this stage are of 10 by 10 configuration.

In the quaternary stage there are five trunk sections, each section comprised of six trunk blocks. Each trunk block is comprised of five, three-by-nine matrices, with the nine horizontal multiples or outlets of a matrix being connected to nine individual supervisory circuits. The paths from the various supervisory side circuits are distributed to the tertiary matrices in a pattern similar to that of the distribution of line side circuits to the tertiary.

One major key to the testing approach used herein is the distribution through one stage of the possible paths from a particular line side circuit to a particular supervisory side circuit, the possible paths being distributed in a regular pattern which may be controlled readily in groups or sections. In the embodiment used herein, the third or tertiary stage is the one with regular distribution of paths as seen best in FIG. 2. In FIG. 2, from a particular PH multiple to a line circuit there are nine paths between the PH multiple and a QH multiple shown as a trunk. Between the ST node and the TQ node, the nine paths are distributed into separate tertiary boards.

In FIG. 3, the primary and secondary stages are combined within line sections designated LS1 up to LS10, if needed. The output paths from each section of 45 and these paths are distributed to respective sections of the T stage.

Figure 4:
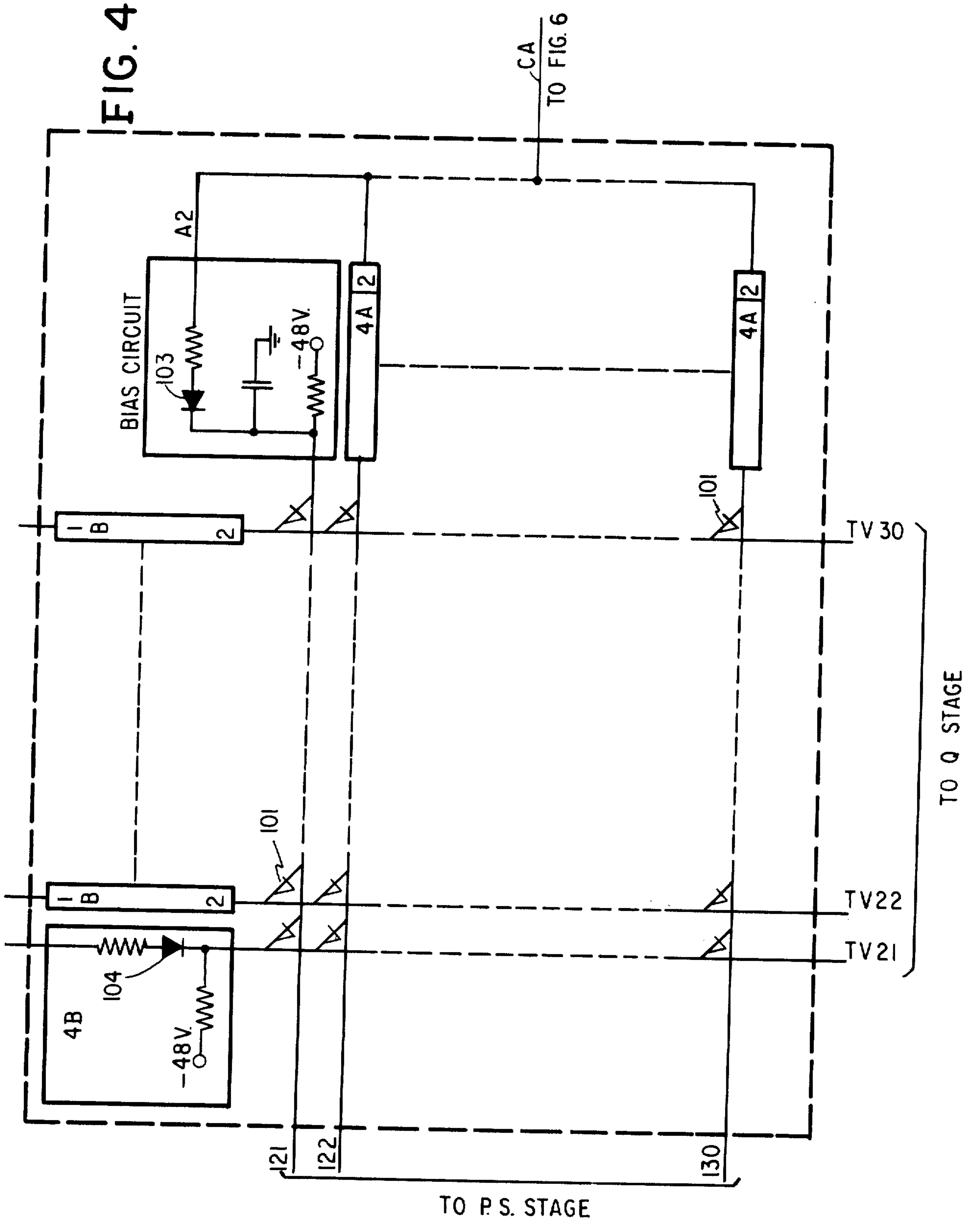
FIG. 4 is a schematic circuit drawing of a typical matrix in the tertiary stage of the network of FIGS. 1 and 3.

As viewed in FIG. 3, there are five trunk sections, TS1–TS5, in the tertiary stage with each section subdivided into three tertiary boards, TBD-1–TBD-3, and each such board further is comprised of three 10-by-10 matrices, an exemplary one being shown in FIG. 4. Thus, within each trunk section, there are nine matrices. The outlets from a line section such as LS1 of the primary-secondary stage (PS) are distributed among adjacent matrices, one PS outlet per T stage matrix. Thus, all possible paths from a particular line side circuit are distributed through different matrices in trunk sections.

The outputs of one section of the tertiary stage are connected in multiple to inlets in one single trunk block in the manner shown in FIG. 3, with each tertiary section being associated and coupled to a like section of the Q stage. In this manner TS1 is coupled to QS1 ...... and TS5 to QS5.

By enabling tertiary board No. 1 switch No. 1 in all sections, one path between each input multiple or PH and each output multiple or QH is enabled. By successively thereafter enabling one switch in each tertiary board, and retaining the remaining switches disabled, successive paths between endpoints can be enabled and checked. Thus, Bd. No. 1, switch 2 is enabled next, followed by Bd. No. 1, switch No. 3. Thereafter the switches in Board No. 2 are enabled sequentially, followed by the switches of Board No. 3.

The operation of the switching network is similar to that set forth in co-pending U.S. Pat. application Ser. No. 264,560 filed 6/20/72 by N. Jovic and assigned to the assignee hereof. In that application, the principle of operating a similar shaped network is disclosed. On a mark on a Q or supervisory multiple of the network, the verticals connected to that multiple are enabled. From the primary end, a capacitive charge is applied to the secondary stage to enable a crosspoint seeking the suitable firing bias from the supervisory end of the matrix.

In FIG. 4, the 10 by 10 matrix has its input multiples shown as horizontal and its output multiples as verticals, jumpered to the quaternary matrix. The crosspoint switching elements are four layer diodes, as shown. A crosspoint responds to suitable bias applied to an input and output multiple conductor to trigger the crosspoint at the intersection of the biased conductors, as is well-known from the cited references.

The matrix of FIG. 4 is one of the three matrices within a section of the tertiary stage, the matrix having a 10 by 10 rectangular pattern of PNPN devices labeled 101. Each such matrix has 10 horizontal multiple conductors, each individually connected to individual conductors comprising the output of the secondary stage. Each matrix horizontal conductor has an A2 bias circuit identical to the one shown. The A2 leads from diode 103 are commoned in a lead labeled CA, the lead from each matric being connected to a control circuit as shown in FIG. 5. The vertical multiple conductors are individually connected to respective conductors of the quaternary stage at their lower end (FIG. 4), while at the upper end, the conductors are connected to control circuits which are not necessary to the explanation hereof.

The normal completion of a path through the stage of FIG. 4 may be followed by the matrix circuit of FIG. 2. When the quaternary matrix extends a binary coded signal or signals to the tertiary decode circuitry of FIG. 5A, via TB1, TB2 and TB4 leads (pulses to −24V) all the tertiary horizontal multiples except busy ones are switched to resistive −20V, to provide proper biasing for the diodes of the secondary stage to fire. This process is done via normally off transistor Q15, and normally conducting transistors Q16, Q17, Q29, Q18, Q30, Q31 following the detection of a binary code on leads TB1, TB2, TB4. Since the tertiary matrix is now properly biased, the firing of the PNPN devices in the secondary stage can take place. When this firing occurs, a capacitor coupled to that stage provides an instantaneous low impedance current sink. This rapidly rising voltage fires the next tertiary diode if such a diode is available. When a secondary stage diode fires, transistors Q17, Q18 and Q31 switch on after a short delay. The non-busy tertiary horizontals consequently switch to approximately −7.5V. This voltage change does not effect the path that has just been made through the matrix because the level at the established path is more positive than −7.5V keeping the diode 103 and its counterparts shown in the sub-circuit 4A reversed biased. Further, when the quaternary matrix extends a binary coded signal or signals (pulses to −24V) to the tertiary decode circuitry of FIG. 5B via TB1, TB2, TB4 and the common TSH leads, the decoded tertiary verticals, except busy ones, are switched to resistive −20V, to provide proper biasing for the tertiary diodes to fire. This is done via one of the normally conducting transistors, Q19–Q28. Since the matrix is now properly biased, the firing of the tertiary PNPN devices associated with the decoded enabled verticals can take place. When this happens, the 500 PF capacitor in the quaternary matrix provides instantaneous low impedance current sink. This rapidly rising voltage fires the next quaternary diode, if such a diode is available. When a quaternary diode fires, the decoded transistor Q19 through Q28 switches on after a short delay. The non-busy tertiary verticals consequently switch to approximately −7.5V. This change does not affect the path that has just been made through the matrix because the level at the established path is more positive than −7.5V, keeping the diode 104 shown in FIG. 4B reversed biased.

The decoded secondary and tertiary control transistors Q17 through Q28 and Q31 are emitter followers, to provide control of the rise and fall times of the control switched voltages. A control of the rise and fall time is needed to prevent generation of excess impulse noise in the matrix, when secondary and tertiary control switching is being done.

Figure 5A:
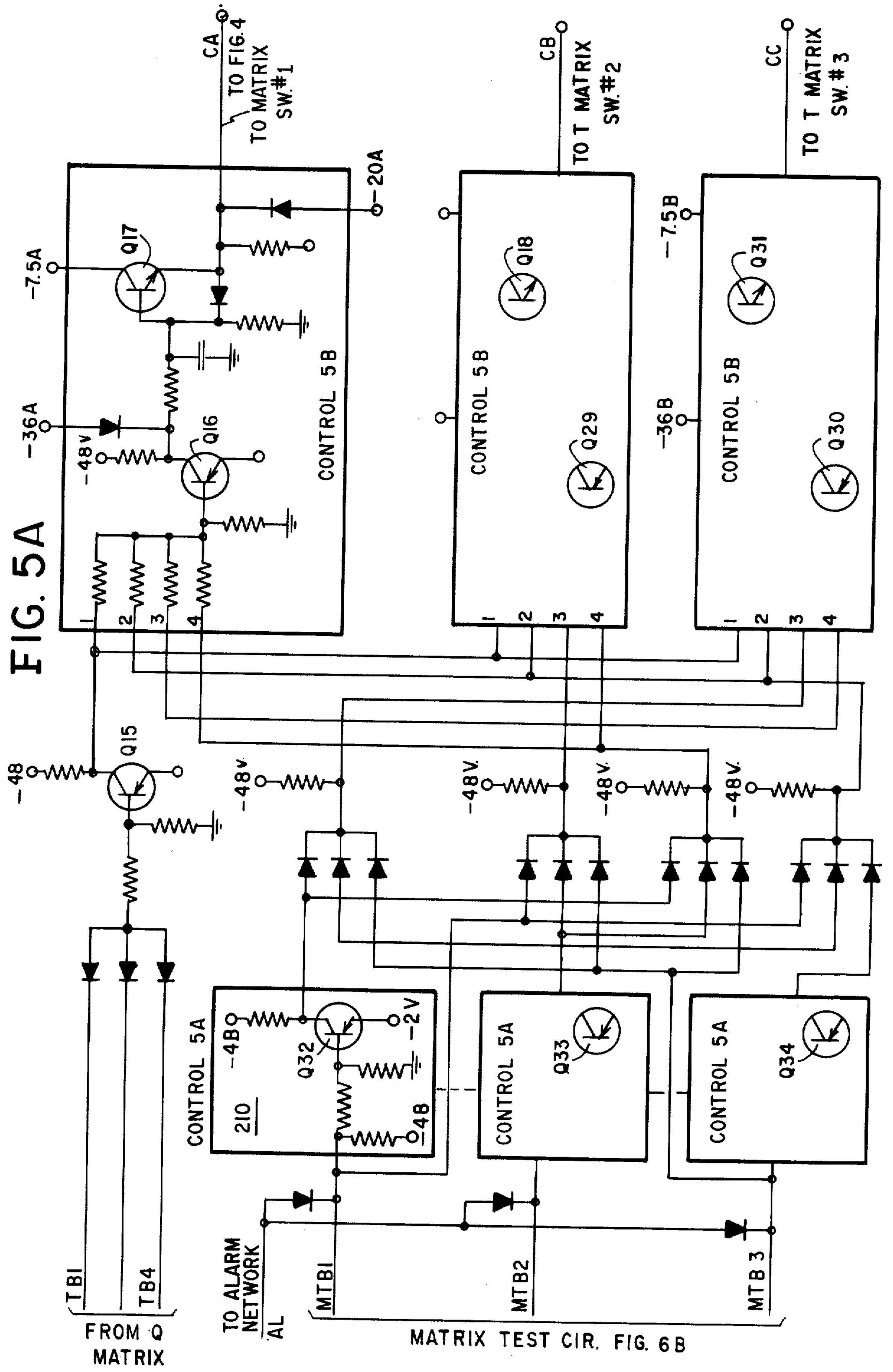
FIGS. 5A and 5B combinedly form a schematic drawing of a decoding circuit applied to the tertiary stage, one matrix of which is shown in FIG. 4.
Figure 5B:
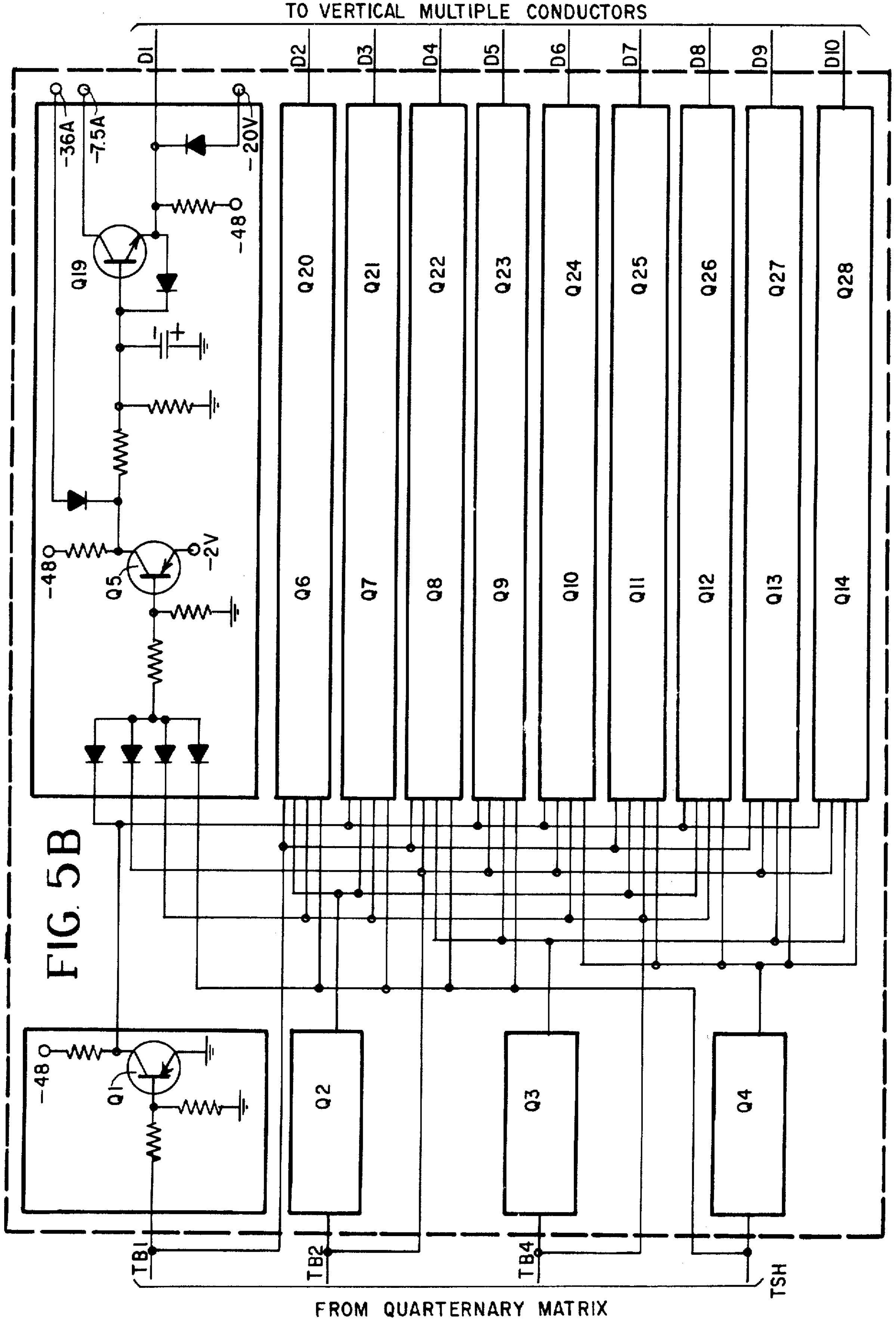

For operating the test program, FIG. 5A operates as follows: A binary code signal on the MTB1, MTB2 and MTB3 leads can inhibit the secondary control to groups of tertiary horizontal multiple TH's (TH01–TH-10–TH20, TH21–TH30). The MTB1 signal at GRD and MTB2 and MTB3 signals at −24V inhibits Q18 and Q31 from turning off via Q29, Q30, the coding diodes, and Q32 and Q33. MTB1, MTB3 at −24V and MTB2 at ground inhibits transistors Q17 and Q31 from turning off. Leads MTB1 and MTB2 at ground and MTB3 at ground inhibits transistors Q17 and Q18 from turning off. By keeping transistors Q17 or Q18 or Q31 on, their corresponding groups of TH's (TH01–TH10, TH11–TH20, TH21–TH30) are kept at −7.5V and thus preventing any four layer diode firing to that group. By controlling the TH groups, the primary horizontals and the quaternary horizontal, a unique path can be selected through the matrix.

Figure 6A:
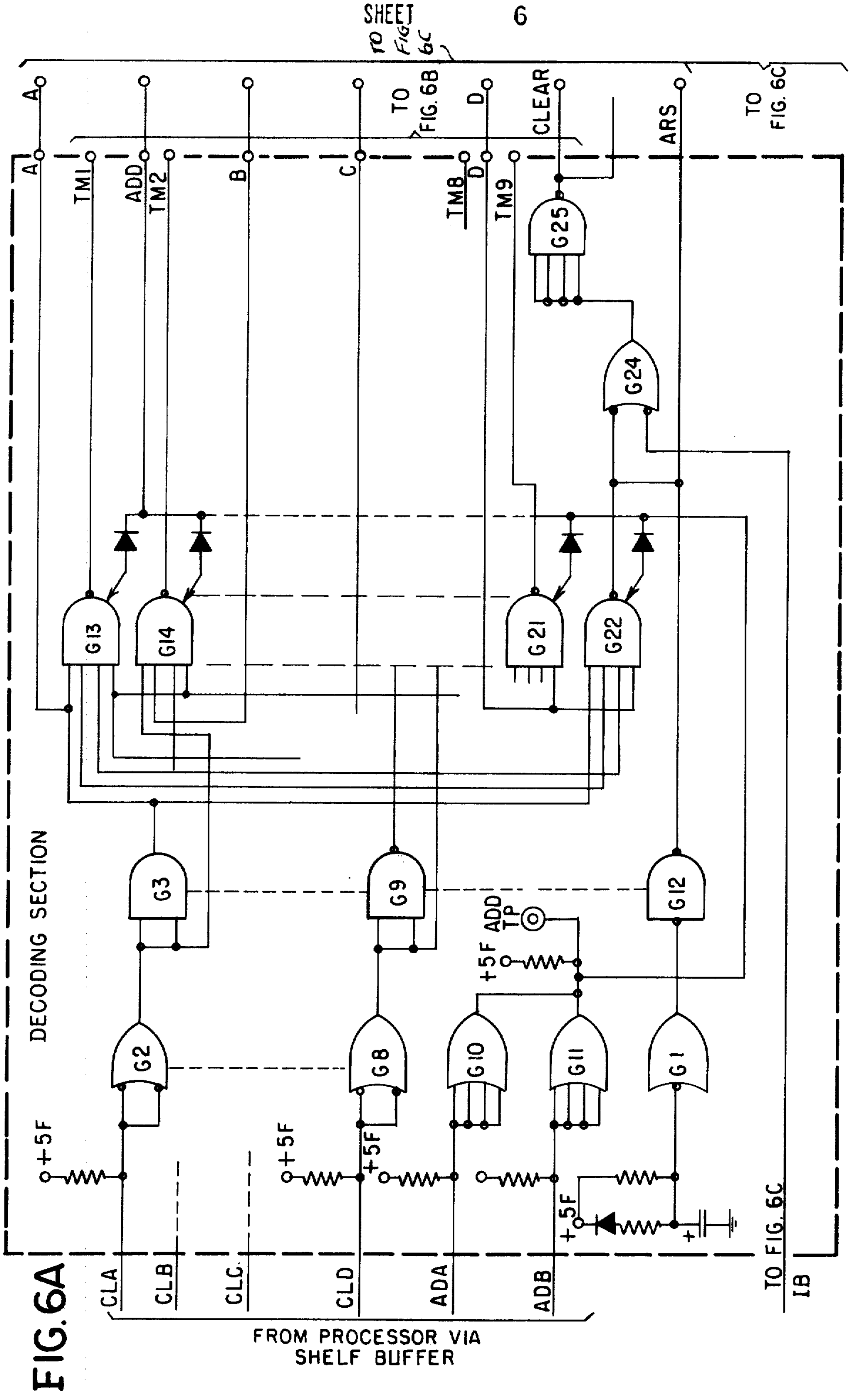
FIGS. 6A, 6B and 6C combinedly form a schematic drawing of the test result sensing circuit used in conjunction with FIGS. 5A and 5B.

The processor sends nine control commands by way of the shelf buffer of the interface circuits and one reset command over leads CLA, CLB, CLC, CLD, ADA and ADB to the matrix test circuit of FIG. 6A. Each control command will control the enabling of one out of nine paths for a Primary to Quaternary Matrix connection. An example will be given to choose one of the nine paths.

To select level 1, a coded MT1 signal is received over leads CLA–CLD (FIG. 6A) from the processor by way of the shelf buffer. This MT1 signal is decoded to activate gate G13 from the decoding section comprised of gates G2–G9. Flip-flops 1, 6 and 9 (FIG. 6B) are triggered to activate transistor Q1, Q6 and Q9 and provide an output signal on lead MTB1-1. This output signal is received on the MTB1 lead of each of the first of three switch matrices of trunk board 1 on each of the five tertiary sections (see FIG. 2).

This MTB-1 signal activates its transistor Q32 (FIG. 5A) and the bottom control 5B to lead CC. This lead will provide enabling bias on switch No. 3 of Board 1 of the five tertiary sections. Thus, one-ninth of the tertiary stage will be enabled and the remaining eight-ninths disabled. This one-ninth constitutes one level and one path of the nine between each line side P port and each supervisory side Q port.

Figure 6B:
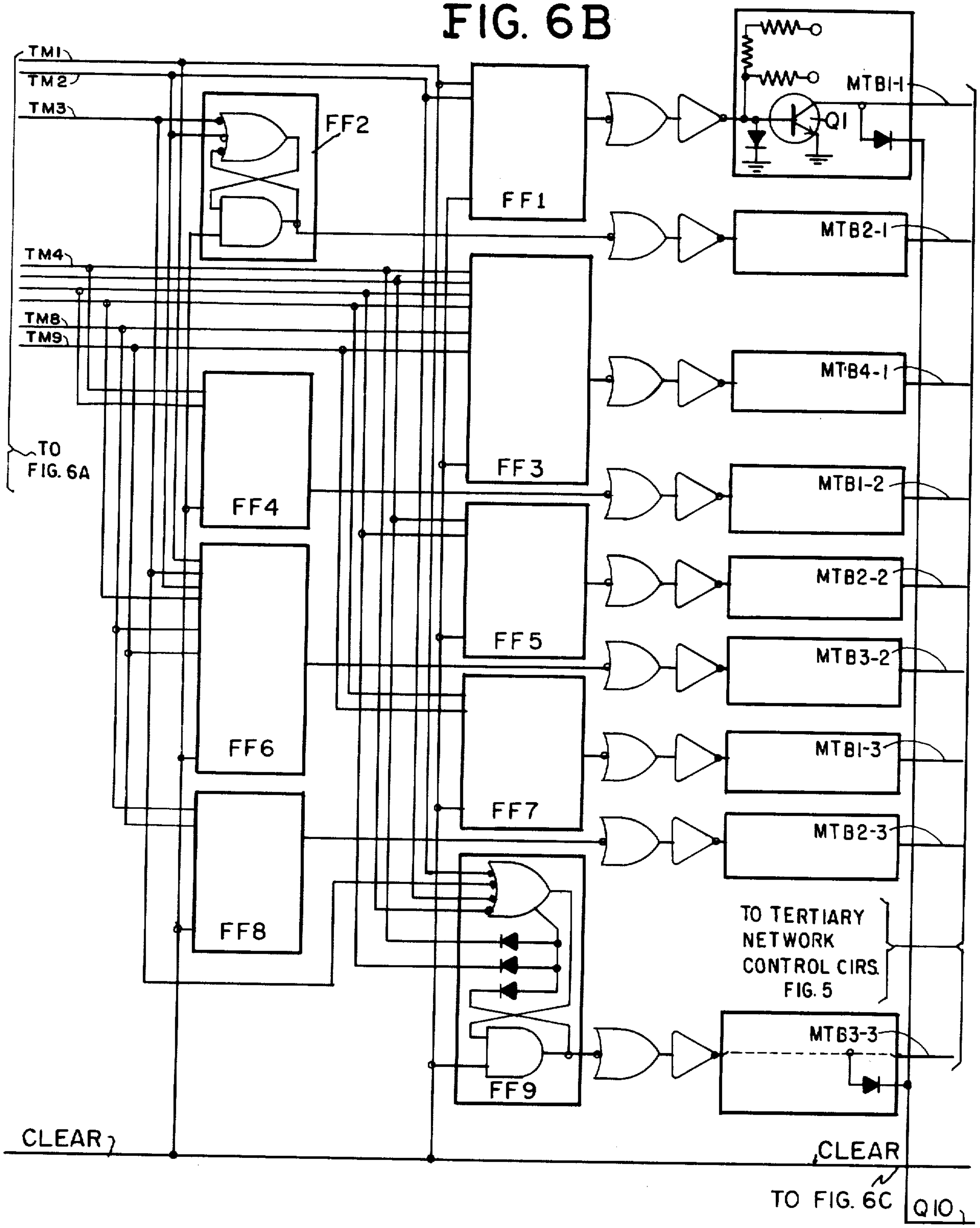

The collector outputs of transistors Q1 through Q9 of FIG. 6B (MTB1-1, MTB2-1, MTB3-1, MTB1-2, MTB2-2, MTB3-2, MTB1-3, MTB2-3, MTB3-3) provide the coding to the tertiary matrix for controlled tertiary matrix firing. With transistors Q1, Q6 and Q9 turned on, one of the nine possibly primary to Quaternary matrix paths is enabled and the remaining possible paths are disabled. Thus, the path enabled can be readily checked.

Flip-flops FF1, FF6 and FF9 will remain set until the shelf buffer sends a release command. When the release command is given flip-flop FF1, FF6 and FF9 and the busy FF G82/G83 will reset via gates G25, G24, G22 and the release command. The status will return to idle when the busy FP G82/G83 resets.

The matrix test circuit will now wait for another control command to initiate testing of the next path section in like fashion to thereby check all nine possible paths through the network.

Figure 6C:
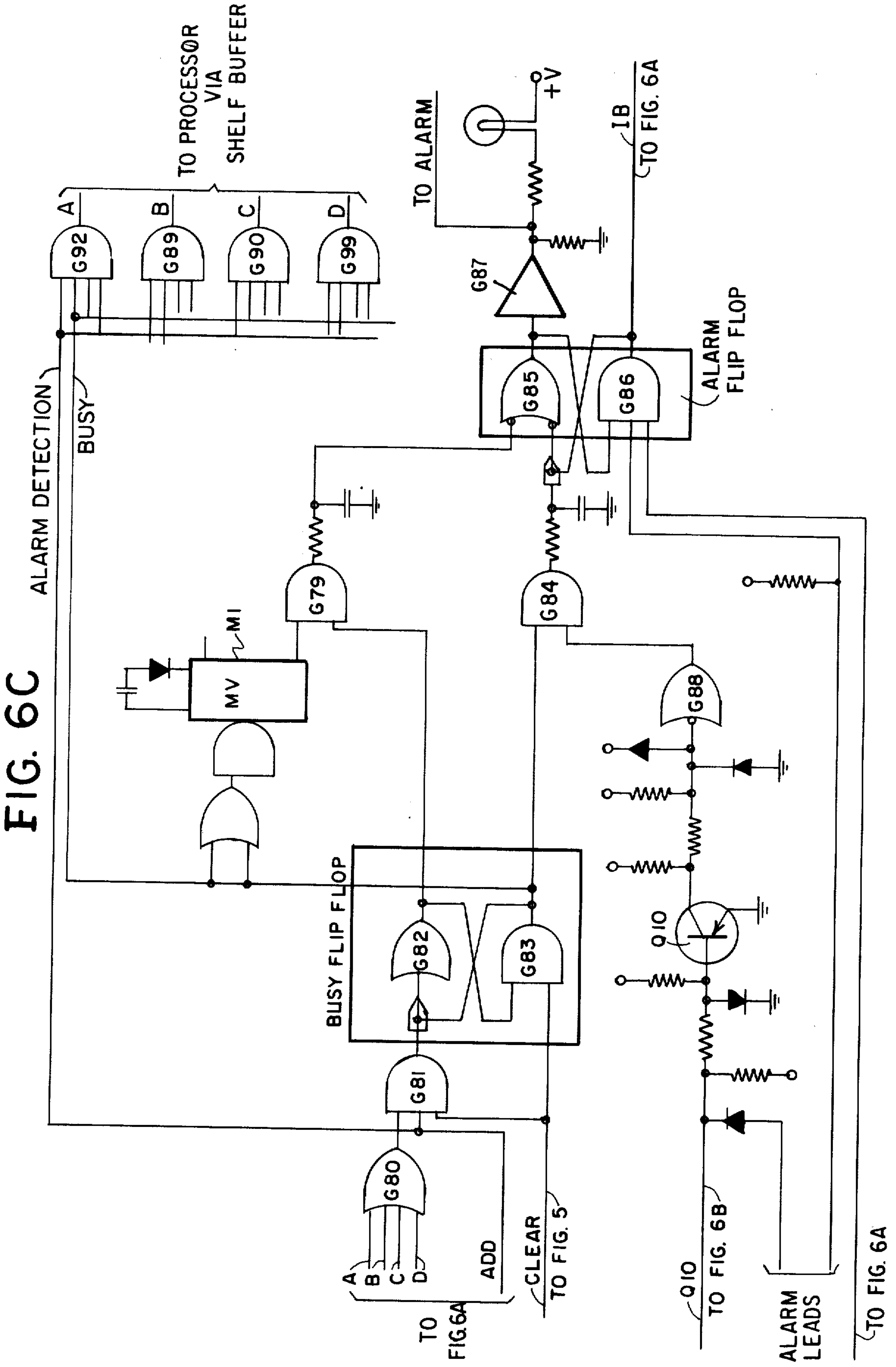

An alarm condition is also provided by FIG. 6C. If the busy FF G82/G83 is set for more than 100 milliseconds, monostable multivibrator M1 will time-out and gate G82 of the busy FF G82/G83 and set the alarm flip-flop FF G85/G86 via G79. This indicates that the test circuit was abandoned in the busy state or the busy FF was set accidentally. 100 milliseconds is enough time to choose a matrix test path. Also, leaving the test circuit busy for longer than 100 milliseconds would limit the number of paths for normal network firing.

An alarm is sent to the maintenance alarm circuit and the alarm lamp will come on via G87 and the alarm FF G85/G86 set.

A forced clear is sent to FF1 through FF9 and the busy FF G82/G83, to clearing any test path control to the tertiary stage via G25, G24 and the alarm FF G85/G86 set.

The alarm FF G85/G86 can be reset from the maintenance alarm circuit or maintenance panel or via G22 (FIg. 6A) responsive to a release command code.

Another alarm condition is indicated if a ground appears on either of the control leads MTB1-1, MTB2-2, MTB3-1, MTB1-2, MTB2-2, MTB3-2, MTB1-3, MTB2-3, MTB3-3, when the matrix test circuit's busy FF G82/G83 is not set, the alarm FF G85/G86 will set via G84, G88, Q10 (clear signal) and a ground on one of the control leads. This indicates that there is either a permanent ground on the control leads, limiting the normal matrix path firing, or that the tertiary matrix is signalling back on the control lead to the matrix test circuit indicating that it has an alarm condition (in this later case no matrix path limitation is present). (Because of pin limitation in the tertiary circuit, its alarm lead had to be shared with its control leads MTB1, MTB2 and MTB3.)

An alarm is sent to the maintenance alarm circuit and the alarm lamp will come on via G87 and the alarm FF G85/G86 set. A forced clear is sent to FF1 through FF9 and the busy G82/G83, to clear any test path control to the tertiary matrix via G25, G24 and the alarm FF G85/G86 set. The alarm FF G85/G86 can be reset from the maintenance alarm circuit or maintenance panel or via G22 and a release command code.

In FIG. 6C, the busy flip-flop is enabled over a lead A–D and gates G80 and G81. A busy status indication will be returned to the processor over a path from the busy flip-flop and the busy lead to gates G89–G92.

The switching network test program can test the entire switching network for shorted and open diodes. The test is accomplished by firing about 200,000 paths in the largest network. In a smaller network the number of paths fired will be proportionately fewer. Assuming that the network test can be run at the pace of 200 ms. per path in an on-line processor, the test will take 11 hours. In an off-line processor, the test can run at 10 ms. per path which will require about one-half hour.

The network test program will be initially designed to run as a resident program in an on-line processor or CPU. In this case there may be a copy of the matrix test in each CPU provided but the program will be run in only one CPU at a time. The program may be modified to run as an on-demand program in the non-resident area by deleting the section of code which is involved with scheduling the network test in the two CPUs. The matrix test may also be modified to run quickly in an off-line CPU by modifying the code which schedules the program.

The network test program will identify faulty diodes by printing a message on the TTY containing three pieces of information. The first piece of information contains the equipment number (ENs) of the P and Q ports between which a path was fired. The second piece of information contains the path level that was fired. In the system disclosed, there are nine path levels in the disclosed network and a particular level is chosen by the network test, on which to fire a path. The third piece of information defines which stage of the network was being tested when the faulty diode was found. The stages are primary-secondary (P-S), tertiary (T) and quaternary (Q).

When the tertiary stage is being tested, only known good diodes in the P-S and Q stages will be used, so that a failure incurred while testing the T stage can be attributed to the T stage with very high confidence. While testing the Q stage, only known good diodes in the P-S stage will be used. Furthermore, if a path through a Q diode fails, nine other paths through the same Q diode will be attempted using nine different T diodes and known good P-S diodes. If all 10 paths fail, then the message will be printed on the TTY indicating that the Q stage was being tested. Since the 10 paths fired used the one Q diode and 10 different T diodes (also 10 different P-S diodes known to be good) the 10 paths will have failed if the Q diode was bad or all 10 T diodes were bad. This means that there is a 91% probability (10/11) that the Q diode and not the T stage was at fault. Therefore, when the message is printed on the TTY indicating that the Q stage was being tested when the failure was found, there is a 91% chance that the faulty diode is in the Q stage.

When testing the P-S stages, only known good Q diodes are used and ten different paths are fired through a faulty diode before condemning it. Therefore, there is a 91% probability that the P-S stages contain the faulty diode when a failure is found whilc testing the P-S stages.

An open diode in the network will cause any path fired through it to fail. To test for open diodes in the T and Q stages, there is only one path fired through each of those diodes. Therefore, each open diode in the T or Q stage will cause one message to be printed on the TTY. To test for opens in the P stage, one, two, three or five paths are fired through each diode (depending on the type of circuit) causing one, two, three or five messages to be printed for each open diode. An open diode in the S stage will cause three, four or five messages to be printed because three, four or five paths are fired through each S diode.

A shorted diode in the P stage will hold a path but it will cause paths through the other nine diodes on the same primary vertical (PV) to fail. Since one, two, three or five paths can be fired through each P diode there can be as many as 45 messages printed for each shorted P diode.

A shorted diode in the S stage will also hold a path but it will cause paths fired through the other four diodes on the same secondary vertical (SV) to fail. Therefore, a shorted S diode will cause as many as 20 messages to be printed.

A shorted diode in the T stage will also hold a path but will cause paths through the other nine diodes on the same tertiary horizontal (TH) to fail resulting in nine messages being printed.

A shorted diode in the Q stage will not affect any paths under zero traffic conditions and will be found in a special test within the network test, where the shorted Q diodes will be tested and identified.

While the running the network test it is assumed that the P port and Q port circuits for functioning properly. When a path fails, the failure will be attributed to the network and not the circuit. If the faulty circuit is within the 90 test ENs allocated to the network test, all paths through them will fail and the network test will stop. If the faulty circuit is not part of the 90 test ENs all paths to that circuit will fail which will show up on the TTY print out as nine failure messages, one on each of the nine path levels of the network.

The network test program is designed to run as low level routining job which will use a very small amount of the real time allocated to call processing. Furthermore, call processing is given preference when selecting P and Q port ENs and when the network test does select ENs, they will be held for less than 20 ms.

To initiate the program, an indication to start program testing will acknowledge the "START" command and begin execution. While executing the program, failure reports (if any), will be issued and a completion message will be printed when the program has been completed, and the program will stop. To re-execute the program, the "START" command must be reissued. While the program is executing, a "STOP" command may be issued at any time which will cause the program to abort the test immediately. A subsequent "START" command will result in the program restarting.

If the program is resident it will begin execution in one CPU immediately after the first start-up, print a start message and run to completion. When the test program finishes in one CPU it will schedule another test program to run in the other CPU in 24 hours. This periodic execution in alternate CPUs will continue indefinitely. The maintenance man may type the STOP command and will abort execution, if it is executing, and it will not be scheduled to run again in either CPU. If the program is not executing at the time the STOP command is issued, periodic scheduling will cease. The START command may be issued at any time which will result in the immediate execution of the test program in the specified CPU. The START command will also cause periodic scheduling or resumption of the test program.

When the test program is executing, it requires the standard system software, including the TTY driver and the call processing programs and interface programs. Furthermore, the test program requires a 90-word table of 90 special ENs (40 P ports and 50 Q ports) which will be specially selected for each system.

The 40 P port ENs correspond to the 40 possible Line Sections in a full network. Each word in the program storage table will contain one EN selected from each equipped Line Section. A totally unequipped Line Section will have a zero value in its associated word.

The table for the line end of the network (P table) is made up of one line end circuit from each line section (as viewed in FIG. 3) comprising the 40 equipment numbers provided for test. The 40 line end circuits are grouped into four matrix units each comprised of ten line equipment numbers. A line equipment number is addressed from the processor and is ordered by matrix unit and by line sections within matrix units. Only when a line section is completely empty does a $\phi$ appear in place of a P port EN. When a line section contains 1 to 160 ENs, any one of these ENs will appear in the P table to represent its line section. The ENs in the P table which represent their line sections should be ENs that are not heavily used by the system, for they will be heavily used by the matrix test program. The most heavily used ENs will be the four ENs at the head of each group of ten (P1, P11, P21, P31) and these should be chosen with special care.

The Q table contains 50 ENs, in groups of 10 which represent 10 ENs in each of the five Trunk Sections (TS) in any matrix unit (MU). The Q port ENs are multipled from one Mu to the other Mus in a multiple matrix unit system; therefore, only one 50-word data table is required since the ENs for the other three possible MUs are identical to the first on the Q side of the network. The 10 Q port ENs in each TS will be chosen so as to represent all the verticals leading from the Q stage section to its associated T matrix section. There are 90 such verticals, where nine correspond to each Q port EN. Therefore, 10 carefully chosen Q port ENs will represent all 90 verticals.

Before the network mark test can begin, it must be verified that the test equipment works properly. The test equipment is: (1) The network test circuit of FIG. 6; (2) the 360 diodes in the P stage associated with the 40 P (test) ENs on all nine levels; (3) the 1800 diodes in the secondary (S) stage where five S diodes lie on each vertical common to the 360 diodes in the P stage; (4) the 1800 Q diodes associated with the 50 Q test ENs on all nine levels, in all four matrix units. Step 1 of the test consists of verifying the test equipment (network test circuit and 3960 diodes) and if the test circuit fails or any of the diodes fail to hold a path the failing equipment will be identified and the test will abort. If Step 1 passes the testing, Step 2 through 5 will be implemented to test the tertiary stage for shorts and opens, the quaternary stage for opens, the primary-secondary stage for shorts and opens and the quaternary matrix for shorts, respectively.

The method described below was designed to give the maintenance man the most meaningful information possible while firing as few paths across the matrix as possible. The procedure utilized tests a small number of diodes, initially, then uses these diodes and the fact that they are good diodes to test the rest of the matrix. This way many of the variables involved are removed which results in a controlled test.

STEP 1 — VERIFY TEST EQUIPMENT

To verify that the matrix test circuit is capable of disabling paths across the matrix, the test program will command the test circuit to disable all nine levels and five paths across the matrix will be attempted, and all five must fail or the test circuit will be assumed to be bad, and the test program will discontinue the test. Five paths are fired to eliminate the possibility that faulty diodes in the matrix will make a faulty test circuit appear to be functioning properly.

Next all the P and S diodes associated with each of the 40 test P port ENs will be verified. Each of the 40 test ports contain nine diodes which lie on the horizontal for that P port. Each of the nine diodes on the horizontal are intersected by a unique vertical and five secondary stage diodes lie on each of these verticals. The P diodes at the horizontal and vertical intersection will be tested, as will be the S diodes which lie on the verticals.

The nine diodes on the P horizontal (PH) are associated with the nine possible paths to that P port. The group of five S diodes on each vertical is also associated with one of the nine paths. Each of the five S diodes on a vertical are associated with one of five trunk sections in the T and Q section of the matrix. Therefore, to test the P and S diodes associated with the 40 P ports defined in the P table, we must fire a path from each P, on all nine levels to test all 360 P test diodes. Furthermore, given a test P port on one of the nine levels, we must fire that P port to five different TS to test the 1800 S diodes. The five TS ENs will be chosen as the first Q (Y) EN in each group of ten ENS in the Q table (that is, Q1, Q11, Q21, Q31, Q41).

If all the paths fire successfully, we know that all the P and S test diodes are capable of holding a path and can be used to test the rest of the network (the P and S test diodes may be shorted but they will hold a path, so this is acceptable).

If a certain path from P to Q on a level 1–9 failed to fire, the bad diode may be in the P, S, T or Q stage. We can eliminate the T and Q stages by firing the same P port on the same level to other Q ENs in the same trunk section. This will be accomplished by firing to the 10 Q from the Q table where all 10 ENs are in the same trunk section. This will result in 10 paths where all 10 paths use the same P and S diodes and 10 different T diodes and 10 different Q diodes. If any one of the 10 paths succeed, the problem in the failing paths must lie in the T and Q stages and the P and S diodes will be considered good so that no error message will be printed. If all 10 paths fail there is a 91% certainty that the fault is in the P-S stage board, where the P (X) appearance lies, and this information will be printed.

If all the P and S test diodes are found to be good, our 40 P port test ENs will give us access to all 1,800 horizontals in the secondary-tertiary cross-connection through good diodes. This important fact will be used to isolate faulty diodes later in the test.

Next the Q diodes associated with the 50 Q test ENs in the Q table will be verified. Every Q EN is multipled to four matrix units (MU) where each of the four appearances are in a different MU. Each of these 200 QH appearances have associated with them, nine diodes for the nine levels. Access is gained to the four appearances of a Q - EN by firing to four different P - ENs, where each of the test P ports is in a different MU. The procedure to be followed will be to fire a path from each Q on all nine levels to P1, P11, P21, and P31.

If all the paths successfully fire, we know that all our 1,800 Q test diodes are capable of holding a matrix path (some of the diodes may be shorted, but this is acceptable).

If a certain path from a test Q port to a test P port fails to fire, the faulty diode may be in the P, S, T or Q diode. The P, S and T stage diodes may be eliminated by firing nine other paths using the same Q on the same level to nine different ENs all in the same line section. The 10 P - ENs used will be from a group of 10 all in the same MU from the P table. These 10 paths will use the same Q diode while using 10 different P diodes, 10 different S diodes and 10 different T diodes. If any of the 10 paths succeed, the faulty paths must have failed because of bad P, S or T diodes, and our Q test diode is good. If all 10 paths failed, there is a 91% certainty that the faulty diode was in the Q matrix and the Q board involved will be identified by printing the P (X) and Q (Y) ENs involved in the path.

If all of the Q test diodes are found to be good, our 50 Q (Y) ENs will give us access to all the 1,800 Q verticals through good diodes. This important fact will be used to isolate faulty diodes later in the test.

In this discussion, it is assumed that the network is fully equipped. In a partially equipped network, unequipped TS and LS will be indicated by zeros in the corresponding words of the P table and Q table. Zeros in the P and Q table will also indicate that corresponding Secondary horizontals and Quaternary verticals are unequipped. The test program will use this information to avoid attempting paths through non-existent diodes in a partially equipped network.

In Step 1 all faulty diodes in our test group of 3,960 diodes will be identified. If any test diodes are bad, the test program will discontinue the test and reschedule itself to run at a later time (only if the program is coreresident). The faulty diodes will have to be fixed before the test will continue.

When the test circuit and all 3,960 test diodes have been verified to be operating properly, the test program will continue with Steps 2 through 5.

STEP 2 — VERIFY TERTIARY STAGE FOR OPENS AND SHORTS

The tertiary stage will be tested by firing one path through each of the 18,000 tertiary diodes using only those P, S and Q diodes which are known to be good (as proven in Step 1). Any failures will be immediately identified as a faulty tertiary diode.

An individual tertiary diode is found at the intersection of a tertiary horizontal (TH) and tertiary vertical (TV). There are 1800 TH which correspond to the 1800 Secondary horizontal (SH) proven in Step 1. There are also 1,800 TV which correspond to the 1,800 quaternary verticals (QV) proven good in Step 1. We fire one path through each of the 18,000 T diodes by firing from each P test port to each Q test port on each of nine levels, (40 × 50 × 9 = 18,000). Each failing path will be printed, identifying the P stage EN, the Q test port EN, the level number (1–9) and the fact that the tertiary stage was being tested. This information will define the exact tertiary area involved.

An open diode in the tertiary stage will cause the network path attempted through it to fail. This will be identified on the TTY print out, as a single message with the P and Q ports identified along with the level number.

A shorted diode in the tertiary stage will hold a path so that the path attempted through a shorted tertiary diode will succeed (assuming there is no other traffic on the network.) However, given a shorted diode in the tertiary stage, paths attempted through the other nine diodes on the same TH will fail. The TH will be associated with one P test port while the nine failing paths will be associated with nine different Q test ports. Thus, a shorted diode can be identified on the TTY print out as a group of nine failure messages which have a common P test port EN, common level number and nine different Q test port ENs. This same pattern of nine TTY print outs, will also occur if there are nine open T diodes on the same horizontal, but this is an unlikely event. In either case, the nine messages will identify a unique crosspoint in the T stage.

The maintenance man should examine carefully the fault messages for the tertiary stage, for the tests in steps 3 and 4 are based on the assumption that the tertiary stage is in reasonably good condition. If more than 10% of the diodes in the tertiary stage are faulty, (1,800 diodes), the fault messages printed out in Steps 3 and 4 may be inaccurate. Therefore, if the maintenance man finds more than 10% of the tertiary diodes to be bad he may ignore the information from Steps 3 and 4, fix the tertiary stage and re-run the test.

The result of the tertiary stage test may be used to further refine the 91% accuracy of the P-S and Q tests. The maintenance man may map the faulty T diodes on a diagram of the network for the system then determine if any of the P-S and Q tests failed because of faulty T diodes. If they did, those error messages may be ignored. It should be stressed, however, that the identification of a P-S failure will be false only if there exist ten open diodes in the T stage, where all 10 are in a row on the same tertiary horizontal. Furthermore, the identification of a faulty Q diode will be in error only if there exist 10 open diodes in the T stage, where all 10 diodes are in a row on the same tertiary vertical.

STEP 3 — VERIFY QUATERNARY STAGE FOR OPENS

The quaternary stage is tested for open diodes by firing 43,200 paths, one through each of the 43,200 diodes in the Q matrix. Each Q - EN has four appearances in the full matrix where each matrix appearance is in a different MU. Each QH appearance has nine diodes which correspond to the nine levels. All of the Q - ENs in the system are found by accessing system data tables, and the four P test port ENs, one in each MU are obtained from the P table (P1, P11, P21 and P31 are used). All 43,200 Q diodes are tested by firing a path from each Q - EN on each of nine levels to the four P test port ENs defining the four matrix units (1200 × 9 × 4 = 43,200).

If one of the paths fail to fire, the faulty diode may be in the T stage or the Q stage. The P and S diodes are known to be good for they were tested in Step 1. The tertiary stage may be eliminated by firing nine more paths each through the same Q diode while using nine other T diodes. This is accomplished by selecting nine other test port ENs from the P table which are in the same MU as was the P test port EN that initially failed. If any of the 10 paths succeed, the faulty diodes must be in the tertiary stage and the Q diode must be good. No error message will be printed for the faulty T diode would have been identified in Step 2. If all ten paths fail, there is a 91% certainty that the faulty diode is the Q stage and a message will be printed identifying the P test port and Q - EN involved in the path, the level number and an indication that the Q stage was being tested. This information will uniquely identify a crosspoint in the Q stage.

Each open Q diode will result in one message being printed which will identify the crosspoint where the faulty diode lies. Shorted Q diodes will not be found in this test, but will be found in Step 5.

STEP 4 — VERIFY PRIMARY-SECONDARY STAGE FOR BOTH OPENS AND SHORTS

A full network will contain 6,400 P side ENs which will be primarily lines. The P-S stages containing 57,600 P diodes and 28,800 S diodes will be verified by firing approximately 100,000 paths across the network. Each vertical in the P-S stages contains 15 diodes (10 P and five S) which correspond to one of nine levels. The 10 P diodes are associated with 10 P ports and the five S diodes are associated with the five trunk sections in the matrix unit that the ports lie in. Step 4 is divided into two parts where the first part uses P ports which have lines connected to them and the second part uses P ports which have line side supervisory equipment connected to them.

A line shelf in the system will have only line boards inserted in that shelf. Some boards may be missing, but non-line boards will not be allowed. Furthermore, the 80 lines on a shelf will be connected to 80 or 120 continuous appearances. The line ENs will be used in the following procedure to test the P-S diodes associated with those ENs.

Every equipped line board of eight-line ENs must have its eight P diodes tested along with the S diodes which may be accessed by those P diodes. If the eight-line circuits lie on a common group of primary verticals, there will be only five S diodes associated with that primary vertical. If the eight-line circuits span more than one group of 10 P ports of a P-S board, there will be 10 S diodes associated with the primary verticals. To accommodate both cases, circuit $\phi$ will be fired to TS 1, 2 and 3. Circuit 1 will be fired to TS 4 and 5, circuits 2, 3, 4 and 5 will be fired to TS 1, 2, 3 and 4 respectively, circuit 6 will be fired to TS 5 and 1 and circuit 7 will be fired to TS 2, 3 and 4. This procedure guarantees that all P and S diodes will be tested, no matter how the line boards are connected to span the 10 P ports in a line board. The above procedure will be used to test each test port line board and will be repeated for each of the nine path levels.

If an attempted path fails, the faulty diode may lie in the P, S or T stage. The Q doide will not be bad, for we will only be using Q - ENs from our Q table which was verified in Step 1. The T stage may be eliminated by firing nine more paths to nine different Q - ENs in the same TS using the same level and P - EN. The nine Q test port ENs will be obtained from the Q table and the nine paths will use the same P and S diodes while using nine different T diodes. If any of the 10 paths succeed, the faulty diode must lie in the T stage and no error message will be printed, for the faulty T diode will have been identified in Step 2.

If all 10 paths failed there is a 91% certainty that the faulty diode lies in the P-S stages, so an error message will be printed, identifying the P - EN and Q test port involved in the path, along with the level (1–9) and an indication that the fault was found while testing the P-S stage. This information will uniquely identify an area in the P-S stage.

An open diode in the P stage will result in the failure of the path that is attempted through that diode. Each P line diode will have one, two or three paths fired through it, depending upon whether it is circuit 0, 1, 2, 3, 4, 5, 6, or 7. Therefore, an open P line diode will result in one, two or three messages being printed. A shorted diode in the P stage will hold a path fired through it but the other nine diodes on the same vertical will not be capable of holding a path. The nine circuits which appear faulty may comprise one line board along with another circuit from the next line board. There are 14 paths fired to each line circuit, and the extra circuit may have three paths fired to it, which gives us a total of 17 paths which may fail due to one shorted P diode.

An open diode stage in the secondary stage will cause all paths fired through that diode to fail. There are three or four paths attempted through each of the five diodes in the S stage which will cause three or four line circuit EN failures to be printed for each faulty S diode. A shorted S diode will hold a path while the other four S diodes on the same vertical will fail. Since there are three or four paths fired to each line S diode there can be as many as 16 messages printed for each shorted diode.

It should be noted that it does not matter how many messages are printed for each faulty diode because while each message may contain different P - ENs, all the P - ENs will indicate that the same P-S area is faulty.

Part 2 of Step 4 will verify the P-S diodes associated with the supervisory P - ENs. Since the appearance of a supervisory P - EN cannot be determined as readily as a line P - EN can, all five S diodes associated with each supervisory P - EN on each of nine levels, will be fired.

For each supervisory P - EN the Q test port ENs Q1, Q11, Q21, Q31 and Q41 will be fired, on a certain level 1–9. This will be repeated for the other eight levels which will result in the nine P diodes and the 45 S diodes associated with the supervisory P - En being tested. All 45 S diodes will be tested, because the five Q test ports used are in five different trunk sections.

If a path fails, the faulty diode must be in the P, S or T stages for the Q test port ENs used have been tested in Step 1. To determine if the P-S or T matrix is at fault, the same technique will be used if the one described when eliminating the T stage while testing in Part 1 of Step 4. The error messages printed in this port will also uniquely determine a crosspoint in the P-S stage.

An open diode in the S matrix will result in ten error messages being printed and a short in the S matrix will result in 45 error messages being printed. This is because the correspondence between Supervisory P - EN and matrix appearance is not known and many paths will have to be fired to be sure of hitting all of the S diodes. The error messages here should not amount to a very large amount, however, because there will only be a small quantity of supervisory P - ENs.

STEP 5 — VERIFY QUATERNARY STAGE FOR SHORTS

When the "Mark QH" command is given to a Q - EN, the QH driver will apply −20 volts to the nine verticals which intersect the QH appearance of the Q - EN. If the matrix is multiplied between more than one MU the corresponding QH of each MU will see the −20 volts. Each group of nine verticals intersects up to 23 other QH appearances in each MU at the nine diodes of each QH. Therefore, if one or more of the nine diodes, of one of the 23 QH which were not commanded to mark, are shorted, that QH that was not commanded to mark will return "Marking in progress" when it is interrogated, because it will see the −20 volts on the verticals through its shorted diode.

The 50 Q test port ENs in the Q table define all the possible Q verticals in the stage. Thus, if we say "Mark QH" to Q1, then interrogate the other 1199 Q - EN in the stage, the Q - ENs which come up "marking in progress" must have a shorted diode in their Q stage. The faulty Q - EN is printed on the TTY along with an indication that a Q diode is shorted. After unmarking Q1, Q2 is marked and the other 1199 Q - ENs are interrogated. Again, any shorted diodes on these nine verticals will be identified. This procedure continues through Q50. When all 50 Q ports have been used, we will have found all the shorted diodes in the Q matrix except for the ones that may be on the horizontals of the 50 Q ports. The 50 Q ports will be tested for shorts by marking to some Q - EN not one of the 50 Q ports and interrogating the 50 Q ports. A marking in progress indicates a shorted diode. This continues through all 1150 Q - ENs which are not a Q test port at which time all the Q ports have been tested for shorts.

In the network test, the Q port will be marked; thus the interrogations must be done on the processor level that was used for normal network path marking. It is not possible to hold this marking level in an on-line processor for the length of time that is required to do 1199 interrogates. Therefore, in practice, the Q port will be marked and a group of fifteen Q ports will be interrogated. The Q port will be unmarked; then on the next cycle, the Q port will be marked again and another 15 Q ports will be interrogated. This will continue until all of the Q ports are interrogated at which time another Q port will be marked and the interrogates will be again done in groups of 15.

A short in one of the 1150 Q - ENs which are not a Q test port will result in one error message being printed. A short in one of the 50 Q test ports will result in 23 error messages being printed. This is because all of the 23 ENs on the same verticals at the Q test port will have been marked once and the faulty Q test port will have been interrogated and found to be in marking 23 times. This will not cause any problems, however, because shorted diodes are quite rare. The above procedure requires the "Mark QH" command to be given 1250 times and the interrogate to be done 120,000. After a "Mark QH" is issued, we must wait 2 ms. before beginning to interrogate the circuits. The interrogate commands may be issued every 12 ms.

When an EN is identified to contain a shorted diode, the diode may be any one of nine diodes which lie on the Q horizontal, all of which lie in one area. However, if the matrix contains more than one MU the short may be in as many as four QHs which are contained in four MUs in four separate areas which may be individual printed circuit boards. It is not possible to narrow down the short to one board except through a manual test method. This is not a big problem, though, for shorted diodes are rare.

When Step 5 is done, all diodes in the network will have been tested for shorts and opens, and all faulty diodes will have been identified. The test program will print out the END message and reschedule itself if it is resident, or stop if it is non-resident.

We claim:

1. An apparatus for testing the individual switching members of a multiple stage switching network of the type in which the network is responsive to marking signals at points at the ends of the network for completing a path serially through the stages of said network between the marked points and in which a plurality of possible paths exist between each set of marked end points and said paths are distributed through at least one stage in said network; the invention comprising means responsive to a test indication for marking a first end point at one end of said network and a second end point at the opposed end of the network, means for disabling all possible paths but one through said one stage between said marked first and second endpoints, means to enable a single path between said marked first and second end points and means responsive to the successful completion of said single path between said first and second endpoints for initiating successive tests of remaining paths between the marked first and second points and means for indicating failure of completion of a path.

2. An apparatus as claimed in claim 1, wherein said apparatus includes a stored program data processor for initiating the operation of the apparatus and for controlling the operation of said disabling and enabling means.

3. An apparatus as claimed in claim 1 wherein there are means operative through said one stage for enabling successive paths between successive end-marked points to test all possible paths between each point at each end of the network.

4. A method of testing the crosspoints of a multiple stage switching network of the type in which the network is responsive to marking signals at an individual port at both ends of said network for automatically completing a path serially through the stages of said network between the signal marked ports over one of a plurality of possible paths through the network and in which the possible paths are identifiable within sections of at least one stage of said network; the invention comprising the steps of marking a port at each end of said network and within said one stage enabling successive ones of a pluarlity of paths between the marked ports, determining the completion or failure of completion of the successive paths, and within said one stage enabling further ones of the paths sequentially between other ports, determining successful path completions and signalling failures to complete paths between the ports, and for sequentially testing other of the network through crosspoints previously successful in test completions to effect like path completions for determining path failures through the one stage.

5. A method of testing as claimed in claim 4 in which certain of said ports are designated as test ports and testing through said test ports is completed for each stage of said network by using path selection through the one stage of said network.

6. An apparatus for testing the respective crosspoints of a multiple stage network wherein each stage comprises an orthogonal matrix of conductors intersecting at the respective crosspoints, and wherein each crosspoint includes a switching element responsive to a signal across its conductors for completing a path thereacross, and in which said network responds to signals at the respective ends thereof for completing one of a plurality of paths serially through the stages of the network between a signal marked point at each end of the network by operating at least one crosspoint in each stage, the apparatus comprising means in one stage of said network responsive to a test indication for disabling crosspoints in said one stage of said network and means for enabling at least one crosspoint in said one stage to force path completion signals through said one crosspoint between said marked point at each end of said network to thereby start testing of successive crosspoints in said one stage between said signalled ends.

7. The apparatus of claim 6, further comprising means responsive to the failure of completion of a path over said enabled crosspoint for producing an indication of said failure.

8. A method of testing individual crosspoints within a network comprised of plural stages arranged for completion of paths serially through said stages between conductors at the respective ends of said network responsive to signals applied to conductors at the respective ends of the network, and wherein between a conductor at one end of said network and a conductor at the opposed ends, there are a predetermined plurality of possible paths through the stages of said network, the method of successively disabling all possible paths through one stage of the network, and for applying signals to the conductors at the ends of said network to test the testing apparatus before initiating tests of said network.

9. The method of claim 8, further including the steps of sequentially enabling crosspoints in said one stage in successive ones of said paths between a conductor at one end of said network and a conductor at the opposite end to which signals are applied to test the successive paths for completion of serial paths between the conductors at the network ends, and for providing indications of unsuccessful path completions.

* * * * *